W. M. ENGLISH.
SALT CELLAR.
APPLICATION FILED APR. 25, 1911.
1,027,467.
Patented May 28, 1912.
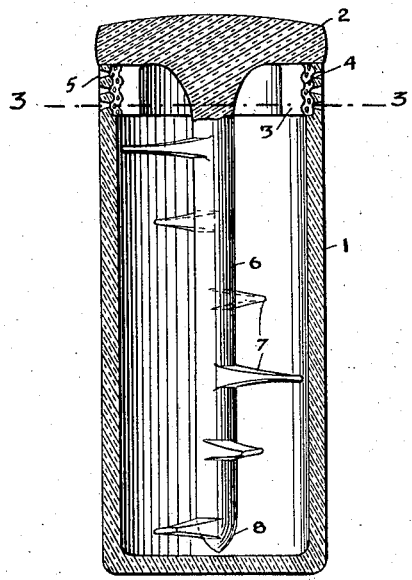
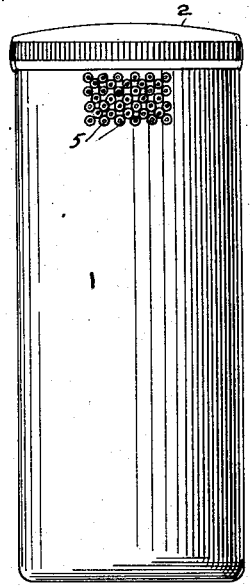
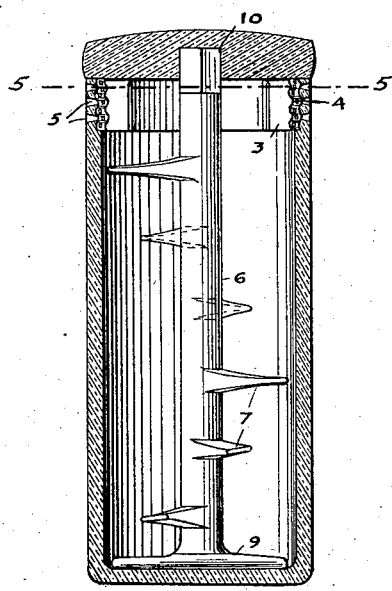
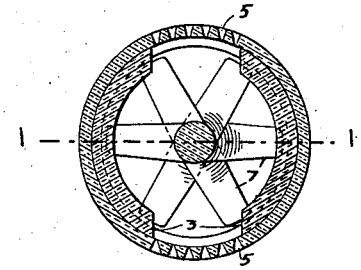
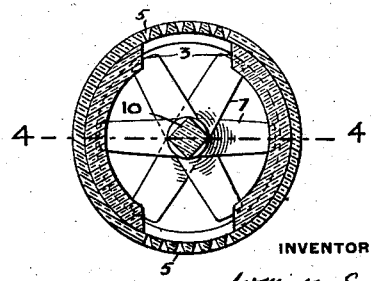
WITNESSES
INVENTOR

UNITED STATES PATENT OFFICE.

WILLIAM M. ENGLISH, OF SAUSALITO, CALIFORNIA.

SALT-CELLAR.

1,027,467.     Specification of Letters Patent.     Patented May 28, 1912.

Application filed April 25, 1911. Serial No. 623,246.

*To all whom it may concern:*

Be it known that I, WILLIAM M. ENGLISH, a citizen of the United States, residing at Sausalito, in the county of Marin and State of California, have invented new and useful Improvements in Salt-Cellars, of which the following is a specification.

The object of the present invention is to provide a salt cellar by means of which the salt will always be maintained in a dry condition, and loose, so that it can be easily shaken from the salt cellar, and the parts of which will be entirely non-metallic and thus not subject to corrosion.

In the accompanying drawing, Figure 1 is a sectional view of my improved salt cellar on the line 1—1 of Fig. 3; Fig. 2 is a side view thereof; Fig. 3 is a horizontal section on the line 3—3 of Fig. 1; Fig. 4 is a sectional view on the line 4—4 of Fig. 5, of a modification of my invention; Fig. 5 is a horizontal section on the line 5—5 of Fig. 4.

Referring to the drawing, 1 indicates the body of the salt cellar and 2 a cover thereof, both being made of glass. Said cover is formed with diametrically opposite depending flanges 3, spaced from each other to provide outlets for the salt, the outer surfaces 4 of said flanges being screw threaded, and screwed within the upper portion of the body of the salt cellar. Said body is formed at diametrically opposite portions of its top with outwardly flaring apertures 5 for sprinkling the salt. After sprinkling, the cover can be rotated through an angle of about 60°, when the inner ends of said apertures will be closed by the flanges 3, thus preserving the salt from the action of the external atmosphere.

In order to maintain the salt in a loose condition I provide a central vertical stem 6, also of glass, which has extending therefrom radial arms 7, and is formed with a pointed lower end 8 to cause it to more easily penetrate the salt when closing the salt cellar. This stem is rotated by rotating the cover, for which purpose, in the form of the invention shown in Figs. 1, 2 and 3, the stem is formed integral with the cover, while in the form shown in Figs. 4 and 5 the stem is formed separate from the cover, having a base 9 resting upon the bottom of the body 1 of the salt cellar, and formed square at the top 10 to be received within a square socket in the cover. The former construction has the advantage of containing fewer parts, while the latter construction permits of the salt cellar being more easily fitted with salt and the cover screwed in place.

I claim:—

A salt cellar having apertures for the discharge of the salt, and means, operatively connected so as to move always in unison, for covering and uncovering said apertures and for agitating the salt, substantially as described.

In testimony whereof I have hereunto set my hand in the presence of two subscribing witnesses.

WILLIAM M. ENGLISH.

Witnesses:
   FRANCIS M. WRIGHT,
   D. B. RICHARDS.

---

Copies of this patent may be obtained for five cents each, by addressing the "Commissioner of Patents, Washington, D. C."